United States Patent
Doi

(10) Patent No.: US 8,565,921 B2
(45) Date of Patent: Oct. 22, 2013

(54) BIPED WALKING ROBOT

(75) Inventor: Masahiro Doi, Chofu (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/549,250

(22) Filed: Jul. 13, 2012

(65) Prior Publication Data

US 2012/0277910 A1 Nov. 1, 2012

Related U.S. Application Data

(63) Continuation of application No. PCT/JP2010/062360, filed on Jul. 22, 2010.

(51) Int. Cl.
G05B 19/04 (2006.01)
G05B 19/18 (2006.01)
B25J 9/16 (2006.01)

(52) U.S. Cl.
USPC .............................. 700/255; 901/1; 318/568.1

(58) Field of Classification Search
USPC .......... 318/568.1–568.25; 700/213, 245–269; 706/45–61; 901/1, 9, 46
See application file for complete search history.

(56) References Cited

U.S. PATENT DOCUMENTS

| | | | |
|---|---|---|---|
| 5,349,277 A | 9/1994 | Takahashi et al. | |
| 5,432,417 A | 7/1995 | Takenaka et al. | |
| 5,459,659 A | 10/1995 | Takenaka | |
| 2004/0044440 A1 | 3/2004 | Takenaka | |
| 2005/0038560 A1 | 2/2005 | Nagasaka | |
| 2005/0049748 A1 | 3/2005 | Lee et al. | |
| 2005/0228539 A1 | 10/2005 | Takenaka et al. | |
| 2006/0217838 A1* | 9/2006 | Sugino et al. | 700/245 |
| 2007/0135966 A1 | 6/2007 | Kawaguchi et al. | |
| 2008/0300721 A1 | 12/2008 | Takenaka et al. | |
| 2009/0312867 A1* | 12/2009 | Hasegawa et al. | 700/245 |

FOREIGN PATENT DOCUMENTS

| | | | |
|---|---|---|---|
| JP | 5-254465 A | 10/1993 | |
| JP | 5-305583 A | 11/1993 | |
| JP | 5-337849 A | 12/1993 | |
| JP | 3-269852 B2 | 4/2002 | |

(Continued)

OTHER PUBLICATIONS

Sven Bottcher, Principles of Robot Location, Semin on "Human Robot Interaction", CS404 Spring 2009, Lecture Links.*

(Continued)

*Primary Examiner* — Khoi Tran
*Assistant Examiner* — Abby Lin
(74) *Attorney, Agent, or Firm* — Kenyon & Kenyon LLP

(57) ABSTRACT

Provided is a method for determining a grounding timing of a biped walking robot. Firstly, a ZMP equation which represents a trajectory of a center of gravity including a first single-leg grounded period in which the robot stands only with a first leg and a second single-leg grounded period in which the robot stands only with a second leg, following the first single-leg grounded period, is solved using a predetermined grounding timing. A second leg ZMP position representing a ZMP position in the second single-leg grounded period is then calculated. When the calculated second leg ZMP position is out of the second leg ZMP permissible area, the grounding timing is modified so that the second leg ZMP position is located in a second leg ZMP permissible area which is defined corresponding to a possible grounding area of the second leg.

10 Claims, 9 Drawing Sheets

(56) References Cited

FOREIGN PATENT DOCUMENTS

| JP | 2003-236781 A | 8/2003 |
|---|---|---|
| JP | 2004-167676 A | 6/2004 |
| JP | 2005-074620 A | 3/2005 |
| JP | 2007-160438 A | 6/2007 |
| JP | 2009-072839 A | 4/2009 |
| JP | 2009-214255 A | 9/2009 |
| WO | 02/40224 A1 | 5/2002 |
| WO | 03/090982 A1 | 11/2003 |
| WO | 2006/064598 A1 | 6/2006 |

OTHER PUBLICATIONS

CS404 Spring 2004 Homepage.*
Jung Yup Kim et al., "Experimental realization of dynamic walking of the biped humanoid robot KHR-2 using zero moment point feedback and inertial measurement", Advanced Robotics, col. 20 No. 6, pp. 707-736 (2006).*
Tomohito Takubo et al, Rough Terrain Walking for Bipedal Robot by Using ZMP Criteria Map, 2009 IEEE International Conference on Robotics and Automation, Kobe, Japan, May 12-17, 2009, pp. 788-793.*
K. Nishiwaki et al.: "Short cycle Pattern Generation for Online Walking Control of Humanoids", Journal of Robotics Society of Japan, vol. 25, No. 6, pp. 834-841, Sep. 2007, Abstract Only.
S. Kajita et al.: "Adaptive walking pattern generation by modifying future ZMP", Proceedings of the 23rd Annual Conference of the Robotics Society of japan, 2G16, Sep. 2005, Abstract Only.
T. Takubo et al.: The Japan Society of Mechanical Engineers Robotics Mechatronics' Koenkai Koen Ronbunshu, vol. 2009, May 24, 2009, 2A1-E07, Abstract Only.
International Search Report & Written Opinion mailed Nov. 9, 2010 of PCT/JP2010/062360, Only pp. 4-5.

* cited by examiner

BIPED WALKING ROBOT

CROSS-REFERENCE TO RELATED APPLICATION

This is a Continuation of International Application No. PCT/JP2010/062360 filed on Jul. 22, 2010, the disclosure of which is hereby incorporated by reference herein in its entirety.

TECHNICAL FIELD

The present invention relates to a biped walking robot.

DESCRIPTION OF RELATED ART

A biped walking robot walks by repeating a single-leg grounded period in which the robot stands only with one leg, and a two-leg grounded period in which the robot stands with both legs. In the single-leg grounded period, the biped walking robot is liable to fall over. The biped walking robot falls over if a grounding position and a grounding timing are not determined appropriately. Below, in the present specification, "walking without falling" is expressed as "walking stably". Furthermore, for the sake of simplicity, the biped walking robot may be referred to simply as "robot" below.

A ZMP equation is often used in order to determine a leg grounding position to achieve stable walking. As commonly known in the field of biped walking robots, ZMP and the ZMP equation were proposed by Miomir Vukoburatoric in 1972. ZMP means a center of pressure of a floor reaction force. The ZMP equation corresponds to an equation of motion of a center of gravity of a robot. In the ZMP equation, an acceleration of the center of gravity of the robot is expressed as a function of the ZMP.

To solve the ZMP equation under prescribed conditions, a time series of ZMP positions (a ZMP trajectory) which enables the position (and/or velocity) of the center of gravity to be kept within a prescribed range is calculated. Keeping the position (and/or velocity) of the center of gravity in a prescribed range means stable walking. On the other hand, since the ZMP is the center of pressure of the floor reaction force, then the actual ZMP is not always located inside a ground contact area of the leg (to be more precise, the ZMP is located inside a support polygon formed by the grounded leg). In other words, the actual ZMP is defined by the grounding position and the grounding timing of the leg. The grounding position and the grounding timing of the leg which are determined so as to achieve the calculated ZMP trajectory guarantee stable walking in principle. However, it should be noted that stable walking is impaired by external disturbances, calculation errors and floor protuberances, and therefore the grounding position and the grounding timing of a leg obtained from the ZMP equation do not strictly guarantee stable walking.

Japanese Patent Application Publication No. 05(1993)-337849 and Japanese Patent Application Publication No. 2004-167676 disclose one example of a method of determining the grounding position based on the ZMP equation. In particular, Japanese Patent Application Publication No. 2004-167676 discloses a method of solving the ZMP equation by setting a velocity of the center of gravity at a start point and an end point as boundary conditions.

Conventionally, the grounding position has been calculated by solving the ZMP equation after previously determining the grounding timing. Since the grounding timing represents the walking velocity, then previously determining the walking velocity is equivalent to determining the grounding timing. Normally, the grounding position has been calculated under conditions of walking at a uniform velocity. More specifically, a ZMP position which satisfies the ZMP equation has been calculated by setting the position and/or velocity of the center of gravity at the start point and the end point of an interval under consideration as the boundary conditions, and by also setting the grounding timing (walking velocity). The grounding position which achieves stable walking is determined in such a manner that the calculated ZMP position is located within a ground contact surface between the leg and the ground. The grounding timing, in other words, the walking velocity, is previously adjusted so as not to exceed mechanical limits, such as the leg movement velocity, the joint rotation velocity, and so on.

BRIEF SUMMARY OF INVENTION

If the grounding timing can be changed flexibly, the stability of walking is increased. For example, if the velocity of the center of gravity (the velocity in the forward direction) increases due to external disturbance, or the like, then not only is the grounding position of the leg shifted forwards, but there is also an increased possibility of avoiding falling, if the grounding timing is advanced (made earlier). Alternatively, if the grounding position is changed in real time in order to avoid an unexpected obstacle, then the walking stability may be increased by changing the grounding timing, as well as the grounding position. However, as far as the present inventors are aware, technology for adjusting the grounding timing under the restriction of guaranteeing walking stability, after determining the grounding position, has not been established. The present specification provides technology for suitably determining a grounding position and a grounding timing of a biped walking robot.

One technology disclosed in the present specification provides a method for determining the grounding position and the grounding timing of a leg of a biped walking robot. This method may include a ZMP calculating step and a grounding position determining step. The ZMP calculating step may calculate a second leg ZMP position in a next single-leg grounded period, by solving a ZMP equation by giving a predetermined provisional grounding timing (predicted grounding timing). More specifically, in this step, the second leg ZMP position may be calculated by solving the ZMP equation by giving boundary conditions of a trajectory of a center of gravity and a grounding timing of a second leg. The boundary conditions may be boundary conditions of a start point and an end point of the trajectory of the center of gravity, which includes a first single-leg grounded period in which the biped walking robot stands with a first leg only and a second single-leg grounded period in which the robot stands with a second leg only, following the first single-leg grounded period. Specifically, the boundary conditions may be, for instance, the position and velocity of the center of gravity at the start point, and the velocity of the center of gravity at the end point. The current time may be selected as the start point. In other words, the position and velocity of the center of gravity at the start point may be the position and velocity of the center of gravity at the current time as measured by sensors. In this case, the first single-leg grounded period corresponds to the current single-leg grounded period. The grounding position determining step may determine the grounding position of the second leg so that the calculated second leg ZMP position is located in a contact area between the second leg and a ground. The "first leg" corresponds to one leg of the biped walking robot and the "second leg"

corresponds to the other leg thereof. Furthermore, typically, the "first leg" corresponds to a standing leg in the current single-leg grounded period and the "second leg" corresponds to the idling leg in the current single-leg grounded period. Moreover, the "second leg" corresponds to the standing leg in the next single-leg grounded period.

Furthermore, if the calculated second leg ZMP position is out of the second leg ZMP permissible area which is defined corresponding to a possible grounding area of the second leg, the grounding timing may be modified in the calculating the second leg ZMP position. Here, the grounding timing may be modified so that the second leg ZMP position is located in the second leg ZMP permissible area.

DETAILED DESCRIPTION OF INVENTION

Figure 1:
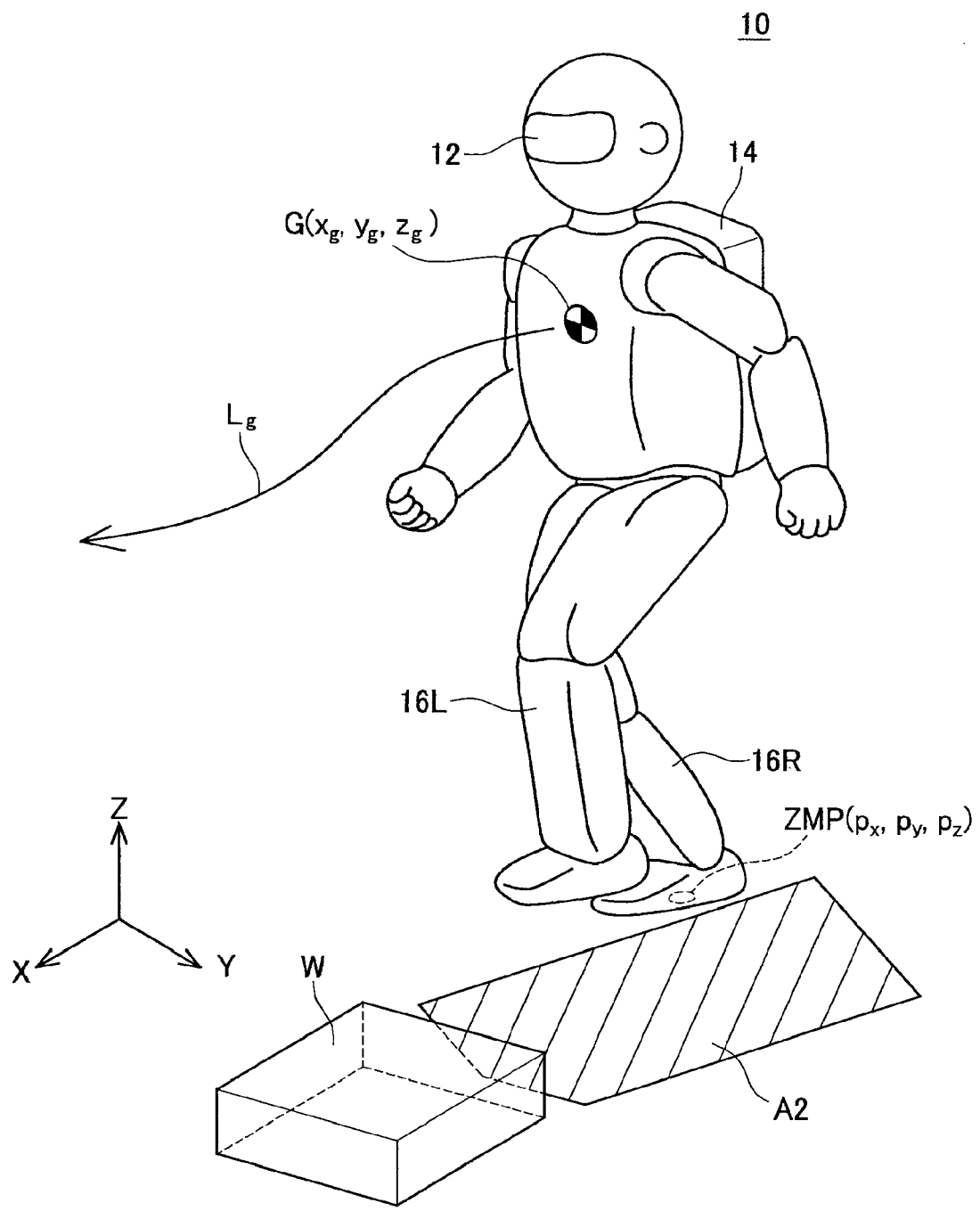
FIG. 1 is a schematic drawing of a biped walking robot.

Before describing embodiments, some of the technical features of a biped walking robot in the embodiments will be described. The basic technique for solving a ZMP equation by setting boundary conditions at a start point and an end point of a trajectory of a center of gravity is disclosed in Japanese Patent Application Publication No. 2004-167676, to which reference is made herewith. A possible grounding area is defined on a basis of a movable range of a leg of the biped walking robot, provided that a ground surface is flat. If there is an obstacle on the ground surface, then the possible grounding area is set to an area outside the obstacle and in the movable range of the leg.

The method described herein typically defines a grounding position and a grounding timing of one next walking step. A case in which the second leg ZMP position calculated on the basis of a ZMP equation under a given grounding timing is located out of the second leg ZMP permissible area corresponds to a case in which a next grounding position which guarantees stable walking cannot be determined. The method described herein adjusts the grounding timing in cases such as this, in other words, in cases where the grounding position cannot be determined in the possible grounding area with the given grounding timing. For instance, if a velocity of a center of gravity at the end point cannot be restricted at the grounding timing, then, by advancing the grounding timing, the walking sequence is modified in such a manner that the leg is grounded in a forward direction earlier than the center of gravity moves forward, and the velocity of the center of gravity can be restricted.

In the method described herein, when the second leg ZMP position calculated with the given grounding timing is located in the set second leg ZMP permissible area, then the grounding timing is used without modification. In other words, the method described herein judges whether or not stable walking can be achieved with the given grounding timing, and modifies the grounding timing if it is judged that stable walking cannot be achieved.

In this method, the ZMP equation which is modified so as to include a first leg ZMP position and a second leg ZMP position as variables may be employed. In this case, the first leg ZMP position represents a ZMP position in the first single-leg grounded period. The ZMP equation may be an equation of motion of the trajectory of the center of gravity, and essentially expresses the acceleration of the center of gravity as a function of the ZMP position. The position of the center of gravity may be expressed as an equation including the ZMP position as a variable, and by integrating this equation, the ZMP equation may be converted into a function of the initial position and the end position of the ZMP (in other words, the first leg ZMP position and the second leg ZMP position). This equation will be described in greater detail in the embodiments. The calculation of the second leg ZMP position may include the following first substep and second substep which use the ZMP equation described above.

In the first substep, the first leg ZMP position and the second leg ZMP position which satisfy the ZMP equation under the boundary conditions and a predetermined initial restraint condition may be calculated. In the second substep, if the calculated second leg ZMP position is located out of the second leg ZMP permissible area, the grounding timing may be modified so as to satisfy the ZMP equation under a second leg ZMP restraint condition which restricts the second leg ZMP position within the second leg ZMP permissible area.

The converted ZMP equation includes four unknown values (variables), namely, the x coordinate and the y coordinate of the first leg ZMP position, and the x coordinate and the y coordinate of the second leg ZMP position. On the other hand, the ZMP equation includes simultaneous equations of an equation related to the x coordinate and an equation related to the y coordinate. Therefore, two restraint conditions are necessary in order to determine the solutions of the four variables. These restraint conditions correspond to initial restraint conditions. The initial restraint conditions may be conditions which specify a first leg ZMP position, for example. Since the first leg corresponds to the current standing leg, then the initial restraint conditions may be conditions which determine the first leg ZMP position within the ground contact surface of the current standing leg.

Desirably, the second leg ZMP restraint condition restricts the second leg ZMP position to a boundary of the second leg ZMP permissible area. The boundary of the second leg ZMP permissible area corresponds to the limit of the ZMP position which guarantees stable walking. In other words, restricting the second leg ZMP position to the boundary of the second leg ZMP permissible area corresponds to determining the second leg ZMP position at the limit which guarantees safety.

Desirably, a first leg ZMP restraint condition restricts the first leg ZMP position to the first leg ZMP permissible area, and the first substep and the second substep include the following processes. The first substep may include re-calculating the first leg ZMP position and the second leg ZMP position which satisfy the ZMP equation under the first ZMP restraint condition if the calculated first leg ZMP position is located out of the first leg ZMP permissible area which is defined within a ground contact area of the first leg. The second substep may include modifying the grounding timing to satisfy the ZMP equation under the second leg ZMP restraint condition and the first leg ZMP restraint condition.

Another technique disclosed herein provides a biped walking robot which is capable of walking more stably than in the prior art. This biped walking robot comprises a controller installed with an algorithm for determining a grounding position and a grounding timing as described above, and a sensor for detecting an obstacle. The controller determines the possible grounding area of the second leg on the basis of an obstacle detection result. The biped walking robot of this kind can change the grounding position and grounding timing in real time, in accordance with the presence of the obstacle. This biped walking robot can increase the possibility of maintaining stable walking, since the grounding timing can also be changed as well as the grounding position, in accordance with the possible grounding area.

The technology disclosed in the present specification provides technology for efficiently determining the grounding position and a the grounding timing which enable stable walking.

A preferred embodiment of the present invention is described now with reference to the drawings. FIG. 1 is a schematic drawing of a biped walking robot 10 according to the present embodiment. Below, the biped walking robot 10 is referred to simply as "robot 10".

The robot 10 comprises two legs 16R, 16L, an obstacle sensor 12 and a controller 14. The legs each have a multiple-link multiple joint structure having a hip joint, a knee joint and an ankle joint. The obstacle sensor 12 is a laser range sensor which detects an obstacle in front of the robot 10. The controller 14 determines the grounding positions and the grounding timings of the legs so as to avoid an obstacle, on the basis of sensor data from the obstacle sensor 12.

The meaning of the reference symbols shown in FIG. 1 will now be described. Firstly, the coordinates system will be described. The X axis corresponds to a forward direction of the robot 10. The Y axis corresponds to a lateral direction of the robot. The Z axis corresponds to a vertical direction. $G(x_g, y_g, z_g)$ represents a center of gravity of the robot 10, and $L_g$ represents a trajectory of the center of gravity. $ZMP(p_x, p_y, p_z)$ represents a ZMP position. In FIG. 1, the robot 10 stands with the right leg 16R only, and the $ZMP(p_x, p_y, p_z)$ is positioned in the ground contact area of the right leg 16R. Below, in order to simplify the description, it is supposed that the walking surface is horizontal. In other words, the ZMP position is represented by two-dimensional coordinates $(p_x, p_y)$.

The reference numeral A2 indicates a possible grounding area of an idling leg 16L. The possible grounding area A2 is determined by the mechanical structure of the leg and an obstacle W. The controller 14 recognizes a position and size of an obstacle W in front of the robot 10, on the basis of sensor data from the obstacle sensor 12. Furthermore, the controller 14 calculates an area that can be reached by the foot of the idling leg, which is determined by the mechanical structure of the leg. The controller 14 determines the possible grounding area A2 by excluding an area occupied by an obstacle W from the area that can be reached. For example, as shown in FIG. 1, the possible grounding area A2 is determined so as to avoid the obstacle W.

Next, the ZMP equation will be described. The ZMP equation is an equation of motion for the center of gravity and expresses the acceleration of the center of gravity G as a function of the ZMP position. It is supposed that the height of the center of gravity (in other words, $z_g$) is a uniform value h. In this case, the ZMP equation can be expressed by (Expression 1) below.

$$ddx_g = \frac{g}{h}(x_g - p_x)$$

$$ddx_y = \frac{g}{h}(y_g - p_y)$$

[Expression 1]

In (Expression 1), "g" represents acceleration due to gravity. "$ddx_g$" represents an acceleration of the center of gravity in the x direction. "$ddy_g$" represents an acceleration of the center of gravity in the y direction. (Expression 1) is an equation which is well known in the field of walking robots. In (Expression 1), the coordinates of the ZMP position, $p_x$, $p_y$, are expressed by (Expression 2) below.

$$p_x = q_{x1}t + q_{x2}$$

$$p_y = q_{y1}t + q_{y2}$$

[Expression 2]

In (Expression 2), "$q_{x1}, q_{x2}, q_{y1}, q_{y2}$" are predetermined constants. Furthermore, "t" represents time. It is known that when the ZMP position $(p_x, p_y)$ is expressed by (Expression 2), a general solution for (Expression 1) (in other words, the trajectory of the center of gravity G) is expressed by (Expression 3) below.

$$x_g = c_{x1}e^{\alpha t} + c_{x2}e^{-\alpha t} + q_{x1}t + q_{x2}$$

$$y_g = c_{y1}e^{\alpha t} + c_{y2}e^{-\alpha t} + q_{y1}t + q_{y2}$$

[Expression 3]

In (Expression 3), "$c_{x1}, c_{x2}, c_{y1}, c_{y2}$" are predetermined constants. Furthermore, $\alpha^2 = g/h$. From (Expression 3), the velocity of the center of gravity G $(dx_g, dy_g)$ is expressed by (Expression 4) below.

$$dx_g = \alpha(c_{x1}e^{\alpha t} - c_{x2}e^{-\alpha t}) + q_{x1}$$

$$dy_g = \alpha(c_{y1}e^{\alpha t} - c_{y2}e^{-\alpha t}) + q_{y1}$$

[Expression 4]

(Expression 3) and (Expression 4) express the trajectory of the center of gravity G. Here, the height h of the center of gravity G is uniform. "Stable walking" is achieved by restricting the velocity of the center of gravity G to no more than a predetermined prescribed threshold value and by determining the grounding position and the grounding timing in such a manner that the coordinates of the center of gravity G do not deviate greatly from the grounding position of the leg. A grounding position and a grounding timing of this kind are calculated on the basis of the ZMP equation.

Figure 2:
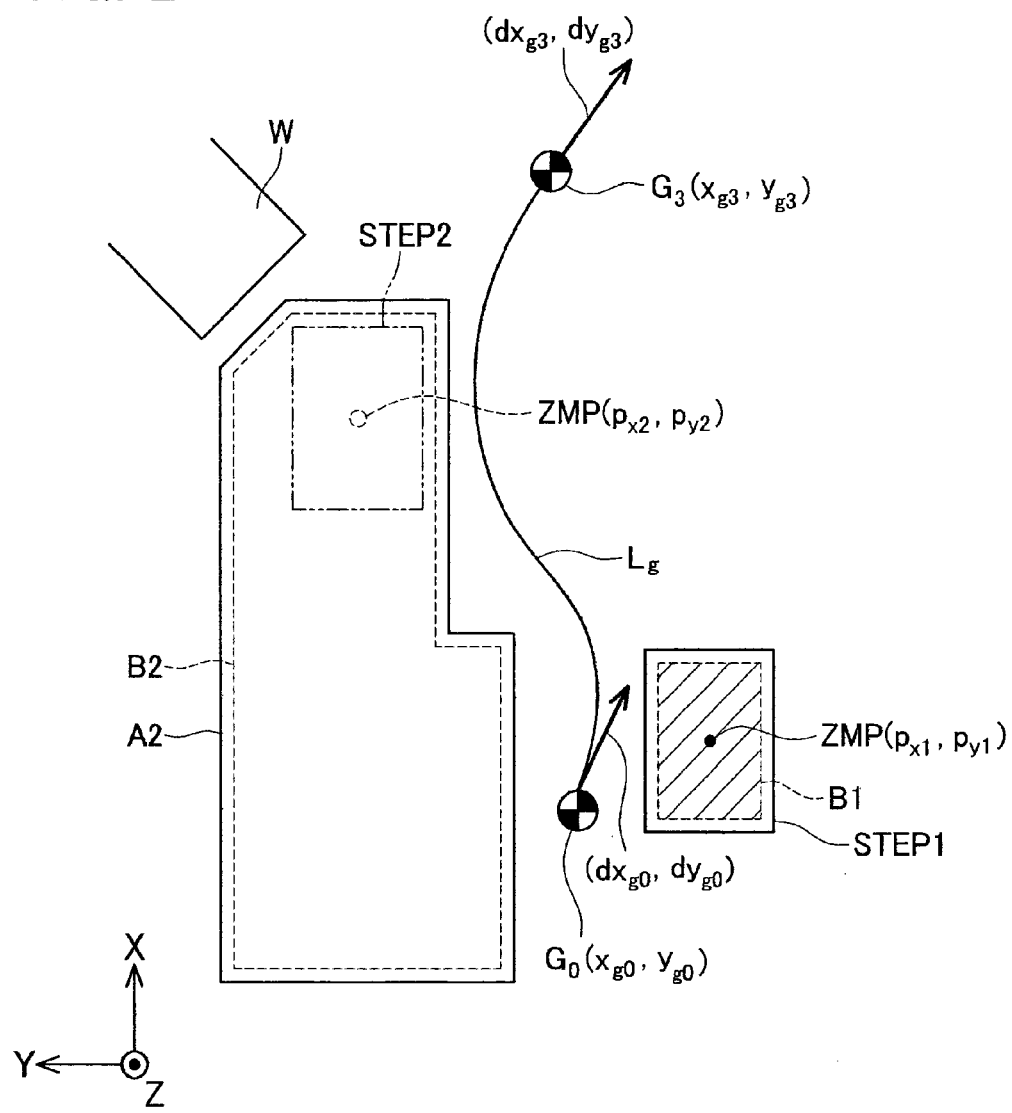
FIG. 2 is a diagram of a ZMP and a trajectory of a center of gravity projected onto a walking surface.

The controller 14 determines the grounding position and the grounding timing of the idling leg 16L. The controller 14 uses (Expression 2) to (Expression 4) to determine the grounding position and the grounding timing which maintain walking stability. FIG. 2 shows a relationship between the trajectory of the center of gravity and the grounding position. At a current time $t_0$, the robot 10 stands with the right leg 16R only and the left leg 16L corresponds to the idling leg. Now, the trajectory of the center of gravity from the current time $t_0$ until an end time $t_3$ will be considered. $G_0(x_{g0}, y_{g0})$ represents the position of the center of gravity at the current time $t_0$. The reference symbol $(dx_{g0}, dy_{g0})$ represents the velocity of the center of gravity at the current time $t_0$. The velocity of the center of gravity at the current time $t_0$ is measured by a sensor. The reference symbol $G_3(x_{g3}, y_{g3})$ indicates the position of the center of gravity at the end time $t_3$. The reference symbol $(dx_{g3}, dy_{g3})$ represents the velocity of the center of gravity at the end time $t_3$. Here, the end time $t_3$ is set previously as an elapsed time from the current time $t_0$. The current time $t_0$ is set in a first single-leg period in which the robot stands with one leg only (the right leg in FIG. 2), and the end time $t_3$ is set in a second single-leg period in which the other leg (the left leg in FIG. 2) is grounded and the robot stands with the grounded leg only. The velocity of the center of gravity $(dx_{g3}, dy_{g3})$ at the end time $t_3$ is predetermined as a boundary condition for guaranteeing stable walking. Here, the velocity of the center of gravity at the end time $t_3$ (boundary condition) is represented by $(v_{xd}, v_{yd})$. The current time $t_0$ corresponds to the start time of the trajectory of the center of gravity which is currently under consideration.

The rectangular shape marked as STEP1 in FIG. 2 indicates a position (ground contact surface) of the foot of the standing leg at the current time $t_0$. Reference symbol B1 indicates an area (first leg ZMP permissible area) in which ZMP($p_{x1}, p_{y1}$) can be located at the current time $t_0$. In the description given below, ZMP($p_{x1}, p_{y1}$) at the current time $t_0$ corresponds to a first leg ZMP position. The first leg ZMP permissible area B1 is restricted to within the ground contact surface STEP1 of the first leg (right leg).

As described below, the area indicated by the reference symbol A2 represents an area in which the current idling leg (second leg) can be grounded, in other words, the possible grounding area. In FIG. 2, the possible grounding area A2 is set so as to avoid the obstacle W. The reference symbol B2 represents a range of positions that the ZMP can take (the second leg ZMP permissible area) in the next single-leg grounded period, in other words, the second single-leg grounded period in which the robot stands with the second leg only. The second leg ZMP permissible area B2 basically overlaps with the possible grounding area A2. In FIG. 2, margins are included and therefore the second leg ZMP permissible area B2 is smaller than the possible grounding area A2. The rectangular shape marked with the reference numeral STEP2 indicates a grounding position of the second leg (predicted grounding position). The reference symbol ZMP($p_{x2}, p_{y2}$) represents a ZMP position in the second single-leg grounded period.

At the current time $t_0$, the robot 10 stands with the right leg only. The controller 14 determines the next grounding position STEP2 and the grounding timing of the left leg in such a manner that the velocity of the center of gravity $(dx_{g3}, dy_{g3})$ at the end time $t_3$ becomes $(v_{xd}, v_{yd})$. Below, the grounding timing is represented by the reference symbol $t_1$. The grounding position STEP2 must be determined in such a manner that the second leg ZMP position $(p_{x2}, p_{y2})$ is contained in the ground contact area of the leg at that time. Furthermore, clearly, the trajectory of the center of gravity must be continuous at all times. Consequently, the object of the controller 14 is to create the trajectory of the center of gravity which satisfies the predetermined velocity of the center of gravity at the end point $(v_{xd}, v_{yd})$, and which also has a continuous position, velocity and acceleration of the center of gravity from the current state of the center of gravity, while setting the second leg ZMP position inside the second leg ZMP permissible area B2 which is defined corresponding to the possible grounding area A2. Stated alternatively, the first leg ZMP position $(p_{x1}, p_{y1})$, the second leg ZMP position $(p_{x2}, p_{y2})$ and the grounding timing $t_1$ are determined using (Expression 1) to (Expression 4) in order that the trajectory of the center of gravity is continuous and the predetermined velocity of the center of gravity of the end point $(v_{xd}, v_{yd})$ is satisfied. The trajectory of the center of gravity, the grounding position and the grounding timing of this kind guarantee stable walking. Since the ZMP position in the first single-leg grounded period in which the robot stands with the first leg only, which is the current standing leg, (the first leg ZMP position), and the ZMP position in the second single-leg grounded period in which the robot stands with the second leg only after striding out on the next step (the second leg ZMP position), are determined, then the period under consideration in the trajectory of the center of gravity includes a first single-leg grounded period and a second single-leg grounded period. In other words, the start point of the trajectory of the center of gravity under consideration is set in the first single-leg grounded period and the end point thereof is set in the second single-leg grounded period. Furthermore, it should be noted that walking stability is impaired by unexpected external disturbances and ground surface protuberances.

Figure 3:
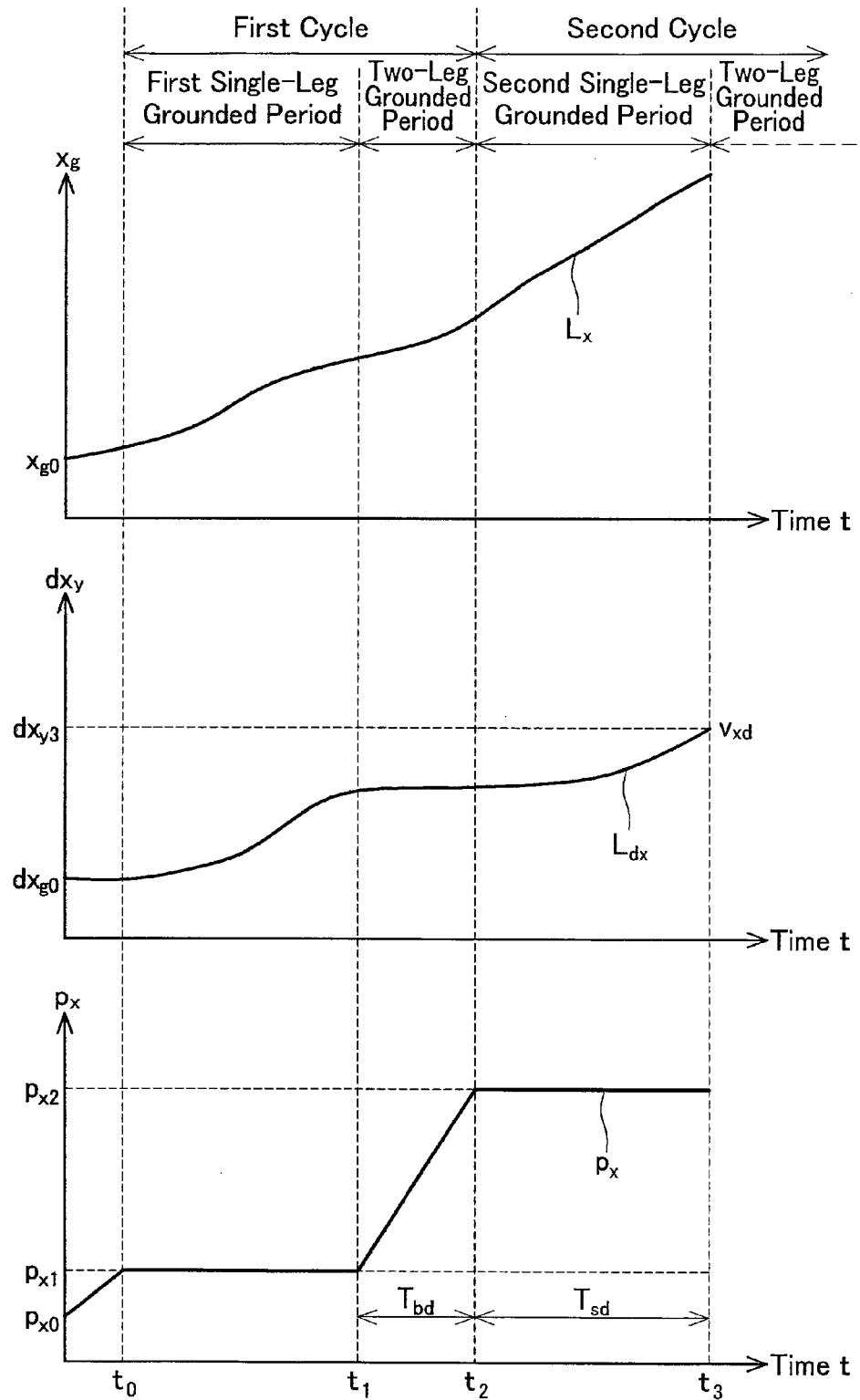
FIG. 3 is a diagram showing one example of a ZMP trajectory and the trajectory of the center of gravity.

FIG. 3 shows a graph of the x coordinate ($L_x$) of the trajectory of the center of gravity, the x-direction acceleration ($L_{dx}$) and the x coordinate ($P_x$) of the ZMP position. The robot 10 walks by repeating a single-leg grounded period in which the robot stands with one leg only, and a two-leg grounded period in which the robot stands with both legs.

In FIG. 3, the time $t_0$ indicates the current time (start time). The current time $t_0$ is in the first single-leg grounded period. In other words, at the current time $t_0$, the second leg (left leg) is an idling leg. The time $t_1$ indicates the grounding timing of the second leg (left leg). The time $t_2$ indicates a ground leave timing of the first leg (right leg). The time $t_3$ indicates the end time. The end time $t_3$ corresponds to a timing at which the first leg (right leg) is grounded again and a two-leg standing period starts. A similar graph can be traced for the y-axis direction also, but the description of the y-axis direction is omitted here. Below, a description relating to the x-axis only is given. Furthermore, $T_{bd}$ in FIG. 3 indicates the time period (duration) of the two-leg grounded period. $T_{sd}$ indicates the time period of the single-leg grounded period. In other words, the grounding timing corresponds to the timing at which a time period $T_{sd}$ has elapsed from the start time of the single-leg grounded period.

The reference symbol $t_0$ represents the current time (start time), the reference symbol $t_1$ represents the grounding timing, $t_2$ represents the ground leave timing of the other leg, and the reference symbol $t_3$ represents the next grounding timing. The x coordinate of the ZMP position ($P_x$) is a uniform value $p_{x1}$ (first leg ZMP position) during the first single-leg grounded period when the robot stands with the first leg only, starts to move toward the grounding position of the second leg at the grounding timing of the second leg $t_1$, and reaches the second leg ZMP position $p_{x2}$ at the time $t_2$ when the first leg leaves the ground. Thereupon, $P_x$ maintains a uniform value (second leg ZMP position $p_{x2}$) until the time $t_3$ when the first leg grounds. As described above, the purpose of the controller 14 is to determine the grounding timing $t_1$, the first leg ZMP position $p_{x1}$ ($p_{y1}$), and the second leg ZMP position $p_{x2}$ ($p_{y2}$). The boundary conditions of the trajectory of the center of gravity are the position $(x_{g0}, y_{g0})$ and velocity $(dx_{g0}, dy_{g0})$ at the start point, and the velocity $(dx_{g3}, dy_{g3})$ at the end point $(=(v_{xd}, v_{yd}))$. The boundary conditions at the start point are measured by a sensor.

If using a general solution of the ZMP equation (Expression 3, Expression 4), the velocity of the center of gravity at the end point $dx_{g3}$ can be expressed by (Formula 5) below.

$$dx_{g3} = n_1 e^{t3} + n_2 e^{-t3} + \qquad \text{[Expression 5]}$$
$$\frac{p_{x1} - p_{x0}}{2t_0}(e^{\alpha(t_3-t_0)} + e^{-\alpha(t_3-t_0)}) + \frac{p_{x2} - p_{x1}}{2(t_2 - t_1)}$$
$$(e^{\alpha(t_3-t_2)} + e^{-\alpha(t_3-t_2)} - e^{\alpha(t_3-t_1)} - e^{-\alpha(t_3-t_1)})$$

-continued

Here, $$n_1 = \frac{1}{2}\left(dx_{g0} + \alpha(x_{g0} - p_{x0}) - \frac{p_{x1} - p_{x0}}{t_0}\right)$$

$$n_2 = \frac{1}{2}\left(-dx_{g0} + \alpha(x_{g0} - p_{x0}) + \frac{p_{x1} - p_{x0}}{t_0}\right)$$

An equation similar to (Expression 5) is obtained in the y direction also. If (Expression 5) and the y-direction equation corresponding to (Expression 5) are re-arranged with respect to $p_{x1}$, $p_{x2}$, $p_{y1}$, $p_{y2}$, by substituting $dx_{g3}=v_{xd}$, $dy_{g3}=v_{yd}$, (Expression 6) below is obtained. In (Expression 6), the grounding timing $t_1$ is treated as uniform. The grounding timing $t_1$ is predetermined, but may be modified as described below.

$$\begin{bmatrix} r_{x1} & r_{x2} & 0 & 0 \\ 0 & 0 & r_{y1} & r_{y2} \end{bmatrix} \begin{bmatrix} p_{x1} \\ p_{x2} \\ p_{y1} \\ p_{y2} \end{bmatrix} = \begin{bmatrix} S_x \\ S_y \end{bmatrix} \quad \text{[Expression 6]}$$

In (Expression 6), $r_{x1}$ and $S_x$ are constants which represent all of the constants in (Expression 5). $r_{x1}$ and $S_x$ include the grounding timing $t_1$. By treating the grounding timing $t_1$ as a constant, it is possible to represent $r_{x1}$ and $S_x$ as constants. (Expression 6) shows simultaneous equations relating to the variables ($p_{x1}$, $p_{x2}$, $p_{y1}$, $p_{y2}$). (Expression 6) is a transformation of the ZMP equation (Expression 1), and includes, as variables, the first leg ZMP position ($p_{x1}$, $p_{y1}$) which represents the ZMP position at the current time $t_0$ and the second leg ZMP position ($p_{x2}$, $p_{y2}$) which represents the ZMP position in the second single-leg grounded period.

The restraint conditions are not sufficient to determine variables ($p_{x1}$, $p_{x2}$, $p_{y1}$, $p_{y2}$) by solving (Expression 6). Therefore, the restraint conditions for solving (Expression 6) are given (these restraint conditions are called the initial restraint conditions). The initial restraint conditions are predetermined. For example, the initial restraint conditions are given by (Expression 7) below.

$$p_{x1} = \rho$$

$$ap_{x2} + bp_{y2} = c \quad \text{[Expression 7]}$$

In (Expression 7), $\rho$, a, b, c are predetermined constants. (Expression 7) sets the x coordinate of the first leg ZMP position to $\rho$, and indicates that the second leg ZMP position ($p_{x2}$, $p_{y2}$) is restricted to the straight line $ap_{x2}+bp_{y2}=c$. By combining the restraint conditions in (Expression 7) with (Expression 6), the following equation, (Expression 8), is obtained.

$$\begin{bmatrix} r_{x1} & r_{x2} & 0 & 0 \\ 0 & 0 & r_{y1} & r_{y2} \\ 1 & 0 & 0 & 0 \\ 0 & a & 0 & b \end{bmatrix} \begin{bmatrix} p_{x1} \\ p_{x2} \\ p_{y1} \\ p_{y2} \end{bmatrix} = \begin{bmatrix} S_x \\ S_y \\ \rho \\ c \end{bmatrix} \quad \text{[Expression 8]}$$

(Expression 8) corresponds to an alternative expression of the ZMP equation, and (Expression 8) shows simultaneous equations which use, as variables, the first leg ZMP position ($p_{x1}$, $p_{y1}$) and the second leg ZMP position ($p_{x2}$, $p_{y2}$). When (Expression 8) is expressed as a matrix, then (Expression 9) below is obtained, and the solution $\{x\}$ of this expression is shown in (Expression 10). Here, [A] is a matrix, $\{x\}$ and $\{s\}$ are vectors.

$$[A]\{x\} = \{s\} \quad \text{[Expression 9]}$$

$$\{x\} = [A]^{-1}\{s\} \quad \text{[Expression 10]}$$

In (Expression 10), it is possible to determine the first leg ZMP position ($p_{x1}$, $p_{y1}$) and the second leg ZMP position ($p_{x2}$, $p_{y2}$) which represents the ZMP position at the grounding timing $t_1$. The processing to this point is, in summary, processing for calculating the first leg ZMP position ($p_{x1}$, $p_{y1}$) and the second leg ZMP position ($p_{x2}$, $p_{y2}$) which satisfy the ZMP equation (Expression 6) under the boundary conditions of the center of gravity at the start point and the end point, and the initial restraint conditions. This processing is called a first substep.

The first substep calculates the first leg ZMP position and the second leg ZMP position by taking the grounding timing $t_1$ as uniform. If the number of expressions in the initial restraint conditions is increased to three or more, then it is possible to determine the first leg ZMP position ($p_{x1}$, $p_{y1}$) and the second leg ZMP position ($p_{x2}$, $p_{y2}$) which satisfy the ZMP equation (Expression 6) by changing the grounding timing $t_1$. If at least two restraint condition equations are parallel and the matrix [A] does not have an inverse matrix, the first leg ZMP position ($p_{x1}$, $p_{y1}$) and the second leg ZMP position ($p_{x2}$, $p_{y2}$) which satisfy the ZMP equation (Expression 6) can be determined by changing the grounding timing $t_1$. The rank of the matrix should be investigated to see whether or not an inverse matrix exists. If the matrix has full rank, then an inverse matrix exists. If an inverse matrix does not exist, then a new restraint condition is given in (Expression 6). The new restraint condition is expressed by (Expression 11) below, for instance.

$$a_1 p_{x1} + b_1 p_{y1} = c_1$$

$$a_2 p_{x2} + b_2 p_{y2} = c_2$$

$$a_3 p_{x2} + b_3 p_{y2} = c_3 \quad \text{[Expression 11]}$$

where, $a_1 \neq 0$, $a_1 > b_1$ (Expression 11) represents three restraint condition equations. $p_{x2}$, $p_{y2}$ are determined uniquely from the restraint conditions in (Expression 11) (Expression 12).

$$p_{x2} = \rho_1$$

$$p_{y2} = \rho_2 \quad \text{[Expression 12]}$$

If (Expression 12) is substituted into (Expression 5) and the equations are re-arranged in terms of $t_1$, $p_{x1}$, $p_{y1}$ under the conditions in (Expression 13), then the equations in (Expression 14) are obtained.

$$t_2 = t_1 + T_{bd}$$

$$t_3 = t_2 + T_{sd} = t_1 + T_{bd} + T_{sd} \quad \text{[Expression 13]}$$

$$k_1 p_{x1} + k_2 p_{x1}(e^{\alpha t_1} + e^{-\alpha t_1}) = R_x$$

$$k_1 p_{y1} + k_2 p_{y1}(e^{\alpha t_1} + e^{-\alpha t_1}) = R_y \quad \text{[Expression 14]}$$

In (Expression 14), the terms $dx_{g3}=v_{xd}$ and $dy_{g3}=v_{yd}$ are used. If $a_1$ is multiplied by the first equation in (Expression 14), $b_1$ is multiplied by the second equation, and the results are added together, then the following (Expression 15) is obtained.

$$a_1(k_1 p_{x1} + k_2 p_{x1}(e^{\alpha t_1} + e^{-\alpha t_1})) + b_1(k_1 p_{y1} + k_2 p_{y1}(e^{\alpha t_1} + e^{-\alpha t_1})) = a_1 R_x + b_1 R_y \Leftrightarrow c_1 k_1 + c_1 k_2 (e^{\alpha t_1} + e^{-\alpha t_1}) = a_1 R_x + b_1 R_y \quad \text{[Expression 15]}$$

(Expression 16) below is obtained from (Expression 15).

$$e^{2\alpha t_1} - \frac{a_1 R_x + b_1 R_y - c_1 k_1}{c_1 k_2} e^{\alpha t_1} + 1 = 0 \quad \text{[Expression 16]}$$

If (Expression 16) is simplified by using β and u below, then (Expression 17) is obtained. The terms β and u in (Expression 17) are given by (Expression 18).

$$u^2 - \beta u + 1 = 0 \quad \text{[Expression 17]}$$

$$\beta = \frac{a_1 R_x + b_1 R_y - c_1 k_1}{c_1 k_2} \quad \text{[Expression 18]}$$

$$u = e^{\alpha t_1}$$

(Expression 17) is a secondary equation of u, and therefore u is determined by (Expression 19) below.

$$u_1 = \beta - \sqrt{\beta^2 - 1}, \, u_2 = \beta + \sqrt{\beta^2 - 1} \quad \text{[Expression 19]}$$

From (Expression 19), the grounding timing $t_1$ is modified by (Expression 20) below. As stated above, the original value of the grounding timing $t_1$ was $T_{sd}$.

$$t_1 = \frac{1}{\alpha} \log u \quad \text{[Expression 20]}$$

If $u_1 > 0$ and $u_2 > 0$, then either value of u is selected. Basically, the larger value of u should be selected. In summary, the processing from (Expression 11) to (Expression 20) can be expressed as follows. If the second leg ZMP position ($p_{x2}$, $p_{y2}$) calculated in the first substep is located out of the second leg ZMP permissible area B2 defined corresponding to the possible grounding area A2 of the second leg, then the controller 14 modifies the grounding timing $t_1$ by (Expression 20) in such a manner that the ZMP equation (Expression 6) is satisfied under the second leg ZMP restraint condition (Expression 12) which restricts the second leg ZMP position ($p_{x2}$, $p_{y2}$) to the second leg ZMP permissible area B2 and under the initial restraint conditions described above. This processing is called a second substep.

As shown in (Expression 12), the second leg ZMP position ($p_{x2}$, $p_{y2}$) can be specified as ($\rho_1$, $\rho_2$) by the restraint conditions. ($\rho_1$, $\rho_2$) can be set to any value, and therefore desirably specifies the boundary of the second leg ZMP permissible area B2 (polygonal perimeter line indicated by reference symbol B2 in FIG. 2).

The grounding timing $t_1$ is modified by (Expression 20). In this case, the first leg ZMP position ($p_{x1}$, $p_{y1}$) is re-calculated by the following process. In other words, if the values $r_{x1}$, $r_{x2}$, $r_{y1}$, $r_{y2}$ in (Expression 6) are re-calculated by using the grounding timing $t_1$ which has been modified by (Expression 20), then (Expression 21) below is obtained.

$$p_{x1} = \frac{S_x - r_{x2} p_{x2}}{r_{x1}} \quad \text{[Expression 21]}$$
$$p_{y1} = \frac{S_y - r_{y2} p_{y2}}{r_{y1}}$$

In other words, according to (Expression 21), values are calculated for $t_1$, $p_{x1}$, $p_{y1}$, $p_{x2}$, $p_{y2}$ which satisfy the end point boundary conditions $dx_{g3} = v_{xd}$ and $dy_{g3} = v_{yd}$ of the velocity of the center of gravity under the restraint conditions in (Expression 11). Consequently, even if three restraint conditions are given, it is possible to determine a first leg ZMP position which is inside the first leg ZMP permissible area and a second leg ZMP position which is inside the second leg ZMP permissible area, by modifying the grounding timing $t_1$.

These processes can be expressed as follows. In other words, if the first leg ZMP position ($p_{x1}$, $p_{y1}$) calculated in the first substep is located out of the first leg ZMP permissible area determined inside the ground contact area of the first leg STEP1 (B1 in FIG. 2), then the controller 14 re-calculates the first leg ZMP position and the second leg ZMP position which satisfy the ZMP equation under the first leg ZMP restraint condition which restricts the first leg ZMP position ($p_{x1}$, $p_{y1}$) to within the first leg ZMP permissible area B1 and under the initial restraint conditions. In this case, the controller 14 modifies the grounding timing $t_1$ so as to satisfy the ZMP equation under the second leg ZMP restraint condition, the first leg ZMP restraint condition and the initial restraint conditions, in the second substep.

In the example given above, the number of restraint condition equations is three (Expression 11). If the number of restraint condition equations is two and the two restraint condition equations are two mutually parallel straight lines, then the matrix [A] in (Expression 9) does not have an inverse matrix. If the restraint conditions are given by (Expression 22) below, for instance, then (Expression 8) is written as (Expression 23).

$$p_{x1} = \rho_1$$
$$p_{x2} = \rho_2 \quad \text{[Expression 22]}$$

$$\begin{bmatrix} r_{x1} & r_{x2} & 0 & 0 \\ 0 & 0 & r_{y1} & r_{y2} \\ 1 & 0 & 0 & 0 \\ 0 & 1 & 0 & 0 \end{bmatrix} \begin{bmatrix} p_{x1} \\ p_{x2} \\ p_{y1} \\ p_{y2} \end{bmatrix} = \begin{bmatrix} S_x \\ S_y \\ \rho_1 \\ \rho_2 \end{bmatrix} \quad \text{[Expression 8]}$$

The matrix on the right-hand side of (Expression 23) does not have an inverse matrix. In this case, $p_{x1} = \rho_1$ and $p_{x2} = \rho_2$ are substituted into (Expression 5), and the equation is re-arranged with respect to the grounding timing $t_1$, to yield (Expression 24).

$$e^{\alpha t_1} + e^{-\alpha t_1} = \beta \quad \text{[Expression 24]}$$

(Expression 17) is obtained from (Expression 24), and finally, (Expression 20) is obtained. In this case, the controller 14 can determine $p_{y1}$, $p_{y2}$ by solving (Expression 25) below.

$$r_{y1} p_{y1} + r_{y2} p_{y2} = S_y \quad \text{[Expression 25]}$$

Finally, when the second leg ZMP position ($p_{x2}$, $p_{y2}$) has been calculated, the grounding position is determined in such a manner that the second leg ZMP position is located inside the contact area between the leg to be grounded and the ground. In the example in FIG. 2, the grounding position STEP2 is determined in such a manner that the second leg ZMP position ($p_{x2}$, $p_{y2}$) is positioned in the center of the contact area of the leg. Consequently, the grounding position and the grounding timing of the idling leg are determined. The process for finally determining the grounding position corresponds to a grounding position determining step.

Figure 4A:
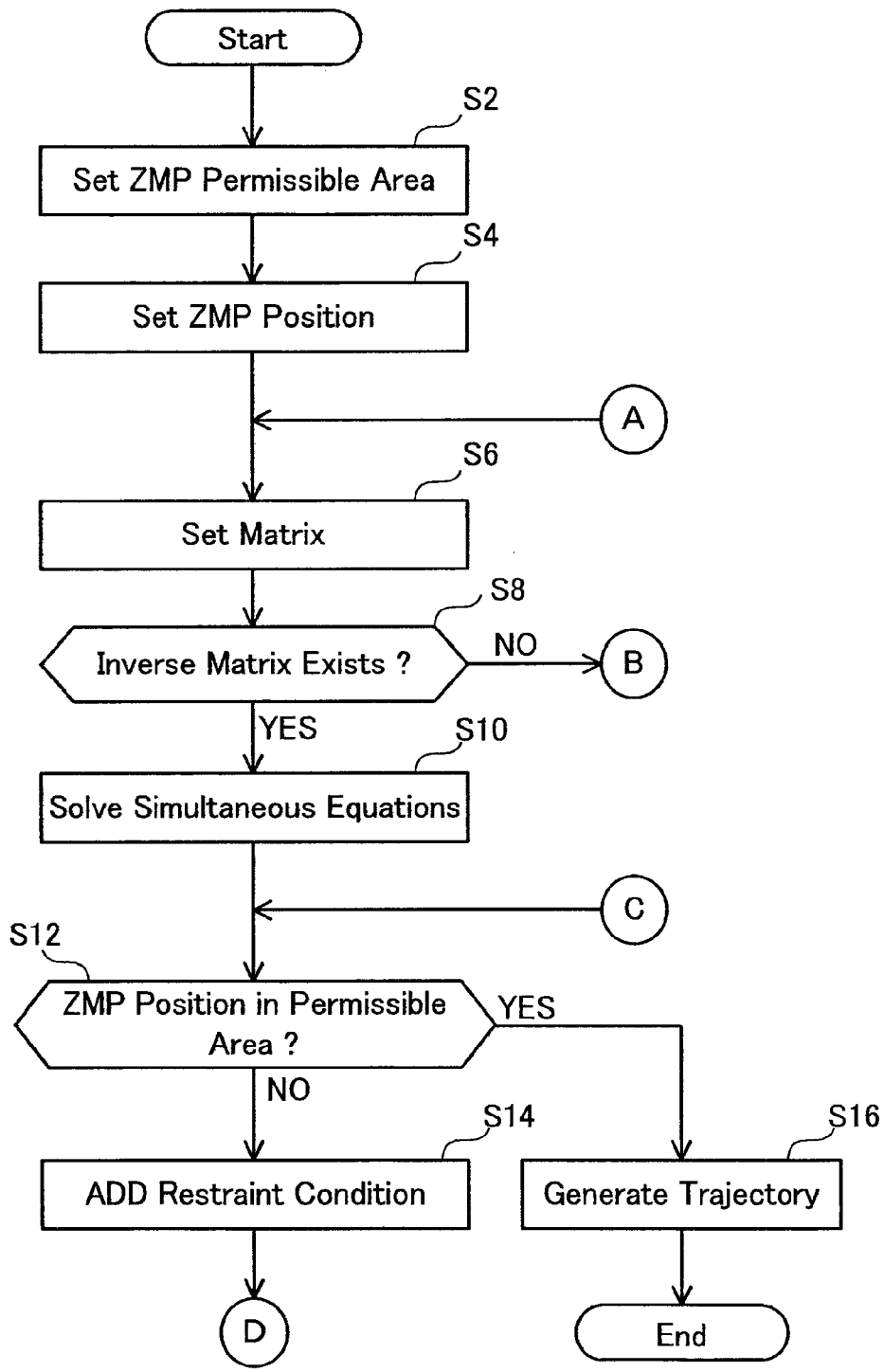
FIG. 4A is a flowchart of processing executed by a controller.
Figure 4B:
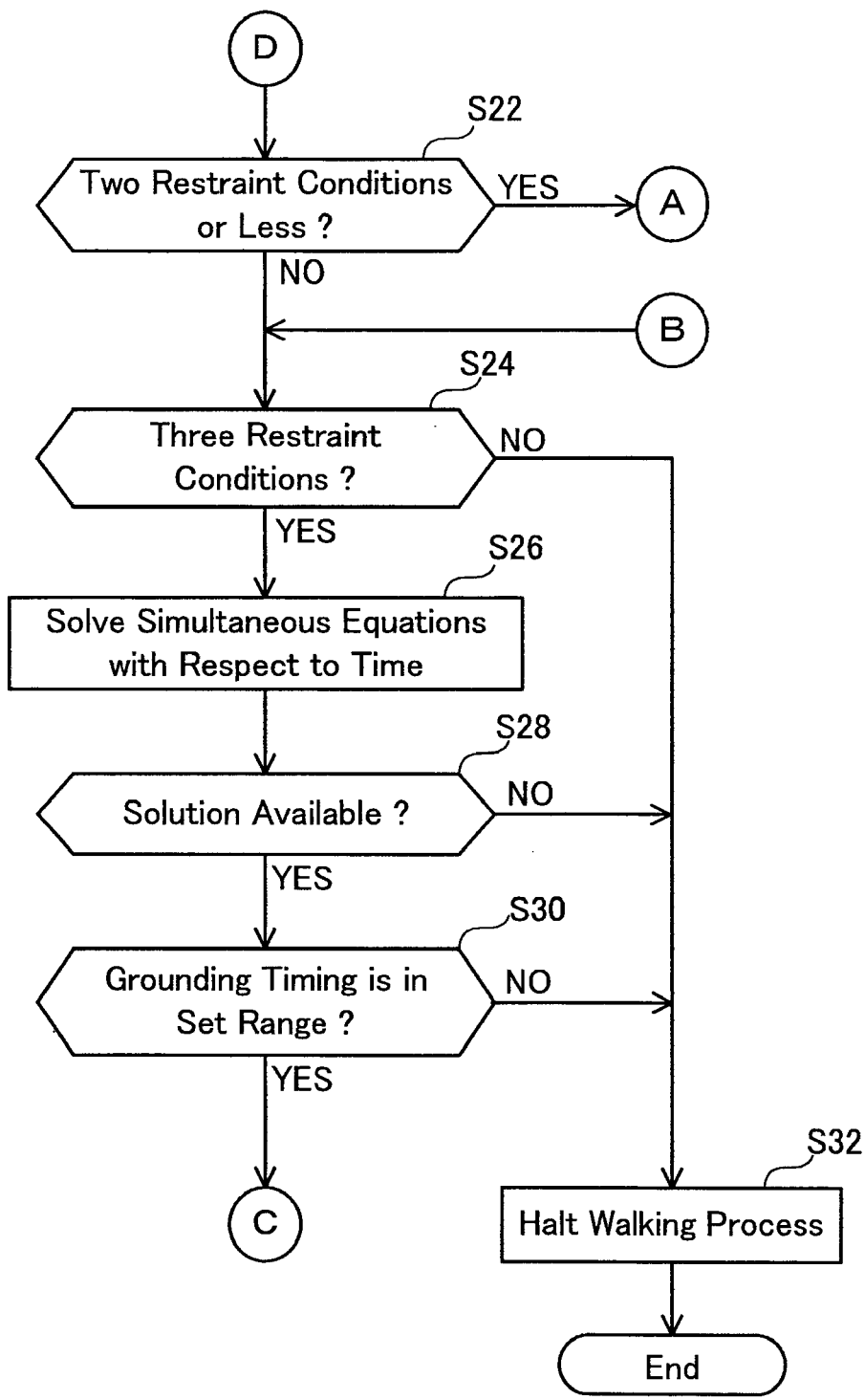
FIG. 4B is a continuation of the flowchart of processing executed by the controller.

The processing described above is expressed in the flowchart shown in FIG. 4A and FIG. 4B. Next, a process of determining the grounding timing and the second leg ZMP position is described with reference to the flowchart in FIG. 4A and FIG. 4B. Firstly, the controller 14 sets the first leg ZMP permissible area B1 and the second leg ZMP permissible area B2 (S2). A concrete example of the first leg ZMP permissible area B1 is shown in FIG. 2. In the example in FIG. 2, the first leg ZMP permissible area B1 has a rectangular shape. The controller 14 determines four straight lines along a perimeter of the ground contact surface of the first leg. The controller 14 defines the region surrounded by the straight lines as the first leg ZMP permissible area B1. The straight lines are represented by the formula $a_i x + b_i y = c_i$. Next, the controller 14 sets the second leg ZMP permissible area. The second leg ZMP permissible area is indicated by the reference symbol B2 in FIG. 2. The second leg ZMP permissible area B2 is set inside the possible grounding area A2.

Next, the controller 14 sets the second leg ZMP position $(p_{x2}, p_{y2})$ (S4). The second leg ZMP position $(p_{x2}, p_{y2})$ is set to the center of the second leg ZMP permissible area B1 or to a predetermined position. In FIG. 2, the second leg ZMP position $(p_{x2}, p_{y2})$ is determined in such a manner that the grounding position of the idling leg is positioned at a front end of the possible grounding area A2. The second leg ZMP position $(p_{x2}, p_{y2})$ is set by (Expression 12), for example.

The controller 14 then establishes the matrix [A] in (Expression 23) (S6). In this case, the height h of the center of gravity, the grounding timing $t_1$, the single-leg grounded period $T_{sd}$, the two-leg grounded period $T_{bd}$ and the velocity of the center of gravity at the end point, $v_{xd}$, $v_{yd}$, are predetermined values. If there is an inverse matrix of the matrix [A] in (Expression 23) (S8: YES), then the simultaneous equations are solved for the given grounding timing $t_1$, to determine the first leg ZMP position $(p_{x1}, p_{y1})$ (S10). The second leg ZMP position $(p_{x2}, p_{y2})$ is established by step S4, for example. Here, the simultaneous equations are given by the ZMP equation (Expression 6) and the restraint condition equation. (Expression 23) corresponds to one example of the simultaneous equations. If the calculated first leg ZMP position $(p_{x1}, p_{y1})$ is located in the first leg ZMP permissible area B1 and the set second leg ZMP position $(p_{x2}, p_{y2})$ is located in the second leg ZMP permissible area B2, then the controller 14 uses the calculated first leg ZMP position $(p_{x1}, p_{y1})$ and second leg ZMP position $(p_{x2}, p_{y2})$ as the ZMP positions to be determined (S12: YES). In this case, the controller 14 determines the grounding position STEP2 of the idling leg (see FIG. 2) so as to include the second leg ZMP position. Finally, the controller 14 determines the trajectory of the idling leg in such a manner that the idling leg moves towards the grounding position STEP2 (S16). The controller 14 controls the knee joint in such a manner that the foot of the idling leg moves along the determined trajectory.

If the calculated first leg ZMP position $(p_{x1}, p_{y1})$ is located out of the first leg ZMP permissible area B1, or if the set second leg ZMP position $(p_{x2}, p_{y2})$ is located out of the second leg ZMP permissible area B2, then the controller 14 adds a restraint condition (S14).

Figure 5:
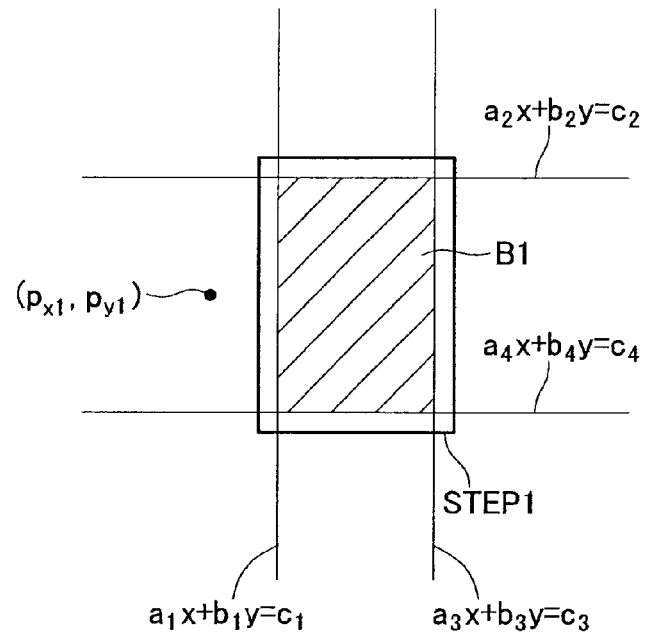
FIG. 5 shows one example of a relationship between a ZMP position and a ZMP permissible area.
Figure 6:
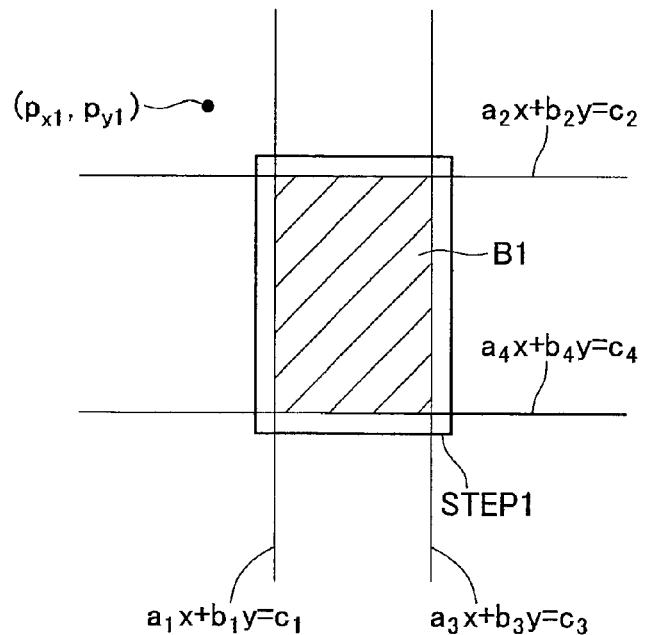
FIG. 6 shows another example of a relationship between the ZMP position and the ZMP permissible area.

An example of restraint conditions in a case in which the calculated first leg ZMP position $(p_{x1}, p_{y1})$ is located out of the first leg ZMP permissible area B1 is described now with reference to FIG. 5 and FIG. 6. The first leg ZMP permissible area B1 corresponds to the area surrounded by the four straight lines ($a_i x + b_i y = c_i$, i=1 to 4) which represent four edges of the foot. The controller 14 extracts the straight lines which are used to represent the fact that the calculated first leg ZMP position $(p_{x1}, p_{y1})$ is located out of the first leg ZMP permissible area B1. In the case of FIG. 5, the straight line $a_1 x + b_1 y = c_1$ indicates that the calculated first leg ZMP position $(p_{x1}, p_{y1})$ is located out of the first leg ZMP permissible area B1. In the case of FIG. 6, the straight lines $a_1 x + b_1 y = c_1$ and $a_2 x + b_2 y = c_2$ indicate that the calculated first leg ZMP position $(p_{x1}, p_{y1})$ is located out of the first leg ZMP permissible area B1. The controller 14 uses the extracted straight lines as new restraint conditions. In the case of FIG. 5, the new first leg ZMP position $(p_{x1}, p_{y1})$ is restricted to the straight line $a_1 x + b_1 y = c_1$. In the case of FIG. 6, the new first leg ZMP position $(p_{x1}, p_{y1})$ is restricted to the point of intersection between the straight line $a_1 x + b_1 y = c_1$ and the straight line $a_2 x + b_2 y = c_2$.

Next, the controller 14 investigates the number of added restraint condition equations (S22, S24). If the number of restraint condition equations is two or less (S22: YES), then the controller 14 returns to step S6 and determines the ZMP position again. Here, the matrix [A] in (Expression 23) changes on the basis of the new restraint conditions. For instance, in the case of FIG. 5, the matrix [A] is expressed by (Expression 8), due to the new restraint condition. The examples in FIG. 5 and FIG. 6 both correspond to a case in which the number of new restraint condition equations is two or less.

If the number of added restraint condition equations is three (S24: YES), then the simultaneous equations described above are solved with respect to time (the grounding timing $t_1$) (S26). In other words, at step S26, the simultaneous equations described above are solved by treating the grounding timing $t_1$ as a variable. (Expression 8) or (Expression 23) correspond to examples of simultaneous equations. By solving the simultaneous equations, the grounding timing $t_1$ is calculated anew. In other words, the predetermined grounding timing is modified. The modified grounding timing $t_1$ ensures that the first leg ZMP position is located in the first leg ZMP permissible area B1, and the second ZMP position is located in the second leg ZMP permissible area B2. The modified grounding timing $t_1$ is calculated by (Expression 20), for instance. Finally, the controller 14 investigates whether or not the modified grounding timing is in the set range (S30). The set range is predetermined.

If the number of restraint conditions is four or more (S24: NO), or if no solution is available to the simultaneous equations which include time (the grounding timing) as a variable (S28: NO), then this corresponds to a case in which there is no grounding position and grounding timing which can achieve stable walking, and therefore the controller 14 halts the walking motion (S32).

If there is no inverse matrix in step S8 (S8: NO), then the controller 14 transfers to step S24 and confirms whether or not there are three restraint condition equations (S24). The processing from step S24 onwards is as that described previously.

Figure 7:
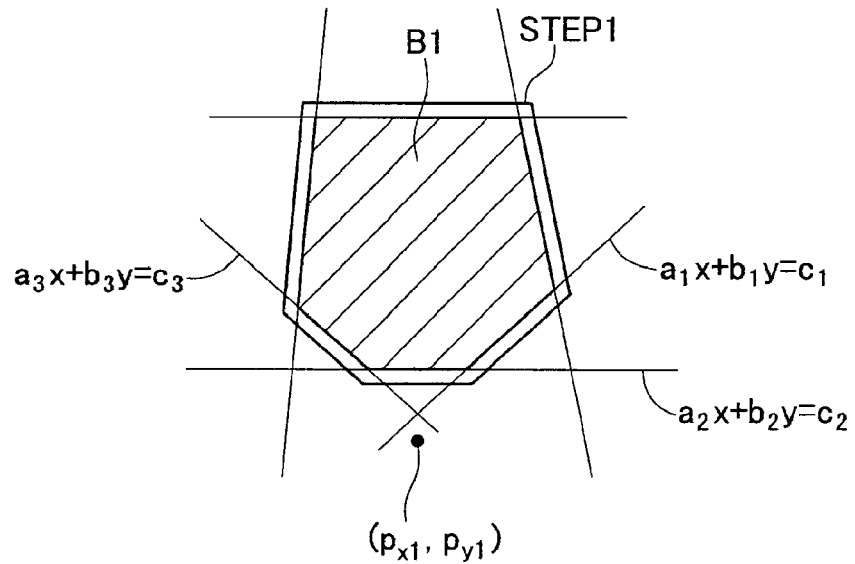
FIG. 7 shows one example in which a number of new restraint conditions can be reduced.

Points to be noted relating to the process of adding restraint conditions will now be described. There are cases where the number of newly added restraint conditions can be reduced. An example of this is described here with reference to FIG. 7 and FIG. 8. In FIG. 7, there are three straight lines which indicate that the first leg ZMP position $(p_{x1}, p_{y1})$ is located out of the first leg ZMP permissible area B1 ($a_1 x + b_1 y = c_1$, $a_2 x + b_2 y = c_2$ and $a_3 x + b_3 y = c_3$). If the number of straight lines which indicate that the first leg ZMP position $(p_{x1}, p_{y1})$ is located out of the first leg ZMP permissible area B1 is an odd number, then it is sufficient to use only the central line (in this case, $a_2 x + b_2 y = c_2$) as a restraint condition. In other words, in this case, the number of restraint condition equations can be reduced from three to one.

Figure 8:
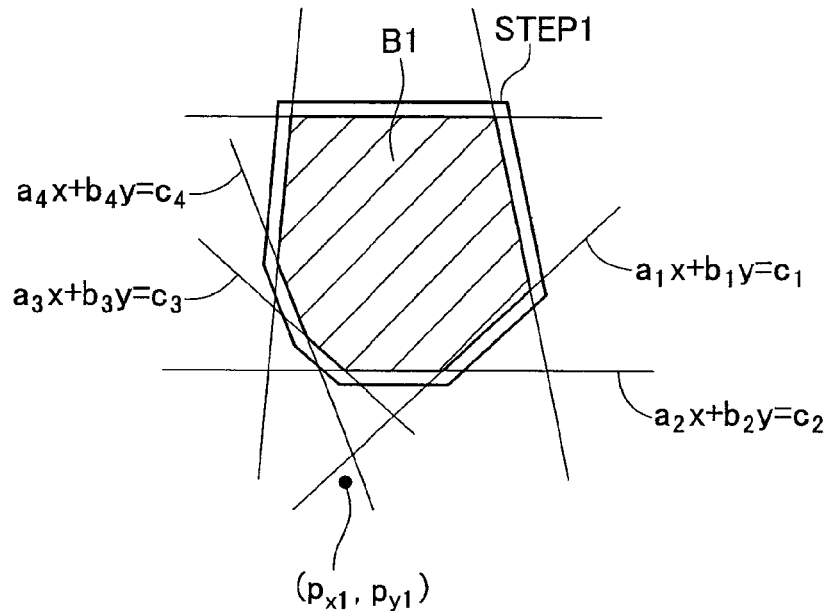
FIG. 8 shows another example in which the number of new restraint conditions can be reduced.

In the case of FIG. 8, there are four straight lines which indicate that the first leg ZMP position $(p_{x1}, p_{y1})$ is located out of the first leg ZMP permissible area B1 ($a_1 x + b_1 y = c_1$, $a_2 x + b_2 y = c_2$, $a_3 x + b_3 y = c_3$ and $a_4 x + b_4 y = c_4$). If the number of straight lines which indicate that the first leg ZMP position ($p_{x1}$, $p_{y1}$) is located out of the first leg ZMP permissible area B1 is an even number (four or more), then it is sufficient to use only the two central lines (in this case, $a_2x+b_2y=c_2$ and $a_3x+b_3y=c_3$) as restraint conditions. In other words, in this case, the number of restraint condition equations can be reduced from four to two.

The algorithm described above is installed in the controller 14 of the biped walking robot 10 shown in FIG. 1. The biped walking robot 10 determines the possible grounding area of the idling leg (A2 in FIG. 2), on the basis of sensor data from the obstacle sensor 12. The robot 10 implements the algorithm described above by using the determined possible grounding area A2. The robot 10 determines the grounding position and the grounding timing of the idling leg (second leg) by the algorithm described above. The robot 10 controls the leg joints so as to achieve the determined grounding position and grounding timing. Consequently, the robot 10 can walk stably.

Figure 9:
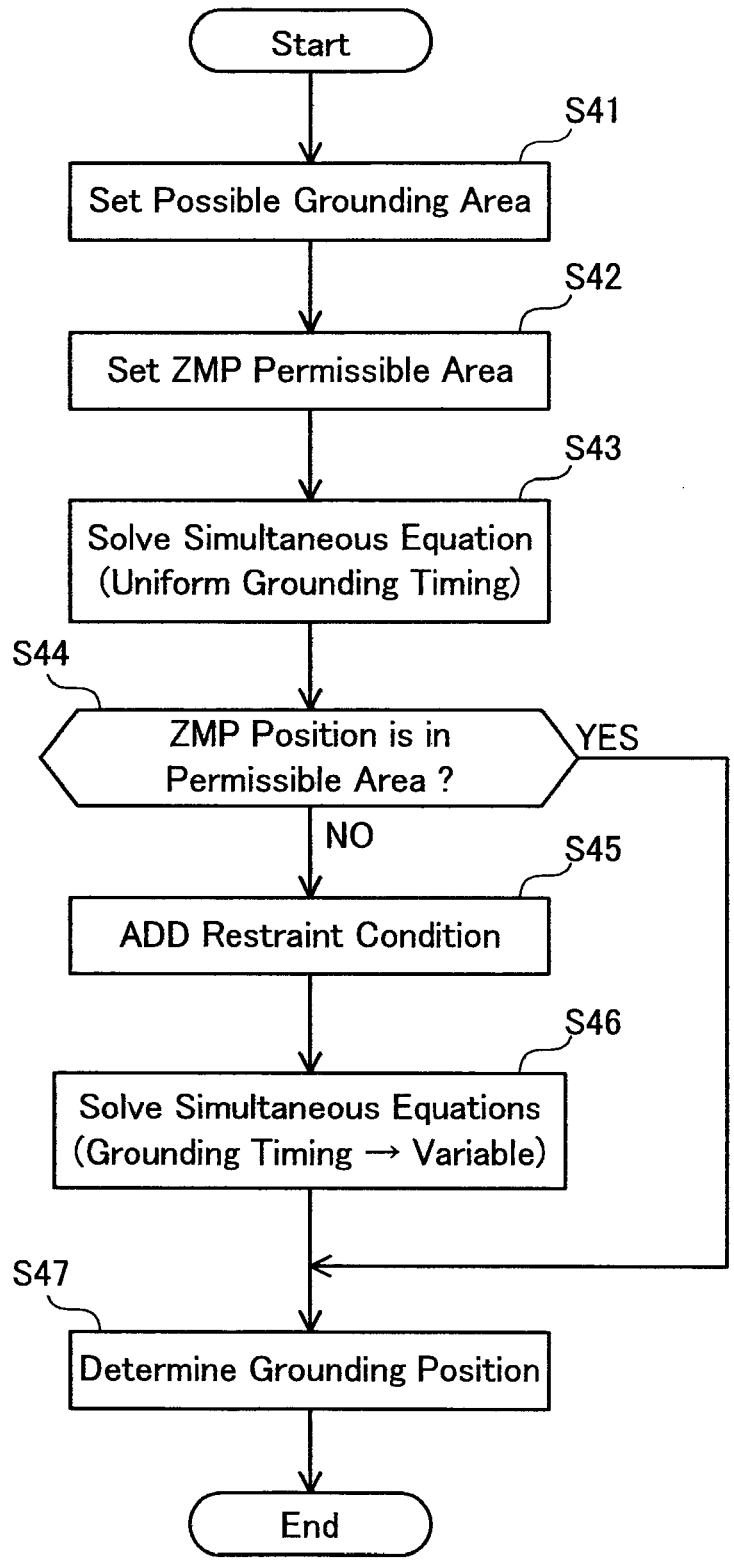
FIG. 9 is a flowchart showing an outline of processing executed by the controller.

The outline of the processing for determining the grounding timing described above is explained now with reference to FIG. 9. It is supposed that the current time $t_0$ is a first single-leg grounded period in which the robot stands with the right leg only (FIG. 1). The controller of the robot 10 firstly determines the possible grounding area A2 of the left leg, which is the idling leg (S41). Next, the controller sets the first leg ZMP permissible area and the second leg ZMP permissible area (S42). Here, the first leg corresponds to the standing leg (right leg) and the second leg corresponds to the idling leg (left leg). The first leg ZMP permissible area corresponds to the ground contact surface of the right leg. The ground contact surface of the right leg is represented by the rectangular shape labeled with the reference symbol STEP1 in FIG. 2. The reference symbol B1 in FIG. 2 corresponds to the first leg ZMP permissible area. Taking account of margins for the purpose of stability, the first leg ZMP permissible area B1 is set to be slightly smaller than the ground contact surface STEP1 of the right leg.

The second leg ZMP permissible area is defined corresponding to the possible grounding area of the left leg, which is an idling leg. The possible grounding area of the left leg is represented by the reference symbol A2 in FIG. 2. The reference symbol B2 in FIG. 2 corresponds to the second leg ZMP permissible area. Taking account of margins for the purpose of stability, the second leg ZMP permissible area B2 is set to be slightly smaller than the possible grounding area A2 of the left leg.

Thereupon, the controller sets boundary conditions at the start point and the end point of the trajectory of the center of gravity which includes the first single-leg grounded period and the second single-leg grounded period where the robot stands with the second leg following the first single-leg grounded period, and also solves a ZMP equation by giving a grounding timing of the second leg and calculates the second leg ZMP position which represents a ZMP position in the second single-leg grounded period. This processing corresponds to a ZMP calculating step. The steps S43 to S46 in FIG. 9 correspond to the ZMP calculating step. As stated previously, the simultaneous equations expressed by (Expression 6) correspond to the ZMP equation. The simultaneous equations in (Expression 6) are obtained by adding boundary conditions of the trajectory of the center of gravity, and the uniform grounding timing $t_1$, to the ZMP equation in (Expression 1).

More specifically, the ZMP calculation step is divided into the first substep and the second substep. The first substep calculates the first leg ZMP position and the second leg ZMP position which satisfy the simultaneous equations (ZMP equation) in (Expression 6), under the boundary conditions of the trajectory of the center of gravity and the predetermined initial restraint condition (S43). The second substep solves the ZMP equation again by treating the grounding timing $t_1$ as a variable (S46), if the second leg ZMP position calculated in S43 is located out of the second leg ZMP permissible area (S44: NO). In other words, the grounding timing $t_1$ which satisfies the ZMP equation is determined. In this case, the second leg ZMP restraint condition which restricts the second leg ZMP position to the second leg ZMP permissible area is added newly to the ZMP equation in (Expression 6) (S45). In other words, the grounding timing is modified in such a manner that the ZMP equation is satisfied under the second leg ZMP restraint condition and the initial restraint condition.

If the ZMP position is in the permissible range in the judgment in step S44 (S44: YES), or if the grounding timing $t_1$ has been determined in step S46, then the controller determines the grounding position of the second leg in such a manner that the calculated second leg ZMP position is located in the contact area between the second leg (left leg) and the ground (S47). This processing corresponds to the grounding position determining step.

In step S43, if the calculated first leg ZMP position is located out of the first leg ZMP permissible area B1 which is defined within the ground contact area of the first leg STEP1, the first leg ZMP position and the second leg ZMP position which satisfy the ZMP equation are re-calculated under the first leg ZMP restraint condition which restricts the first leg ZMP position to the first leg ZMP permissible area, and under the initial restraint condition. This process is also a portion of the first substep. Furthermore, in this case, in step S46, the controller 46 modifies the grounding timing so as to satisfy the ZMP equation under the second leg ZMP restraint condition, the first leg ZMP restraint condition and the initial restraint condition. This process is a portion of the second substep.

Next, another example of the process for determining the grounding timing and the second leg ZMP position will be described.

Figure 10:
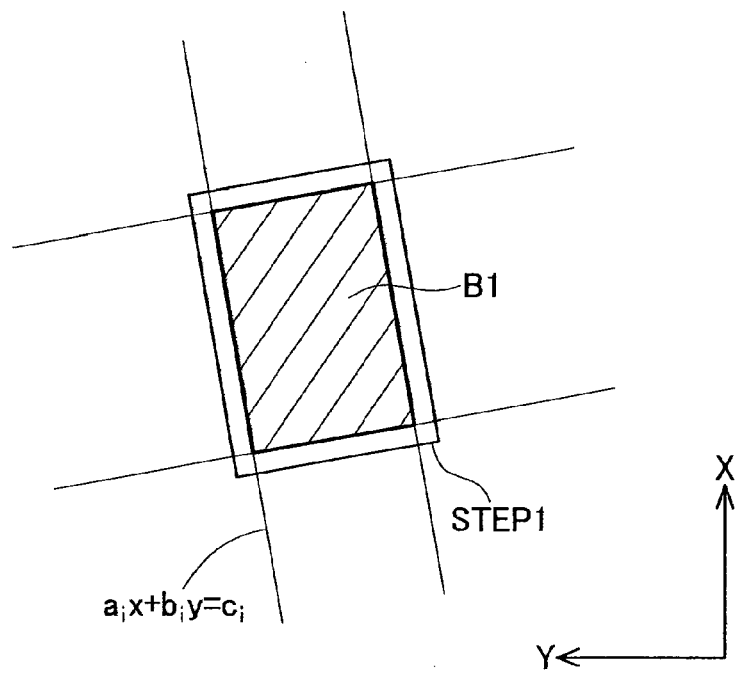
FIG. 10 shows one example of a relationship between a position of a standing leg and the ZMP permissible area.

(First step) Firstly, the permissible area of the first leg ZMP position (first leg ZMP permissible area) which represents the ZMP position in the first single-leg grounded period is set. FIG. 10 shows a relationship between the position (ground contact surface) STEP1 of the first leg (standing leg) at the current time $t_0$, and the boundary line equations which determine the first leg ZMP permissible area B1. Here, it is assumed that the shape of the ground contact surface (the foot under surface) is a rectangular shape. The equation $a_ix+b_iy=c_i$ is parallel to the foot under surface, and represents a straight line which is a prescribed width to the inside of the boundary of the foot rear surface. Here, the xy plane of the coordinates system coincides with the ground contact surface. The foot under surface is rectangular, and therefore four straight lines are determined. The area surrounded by the four straight lines corresponds to the first leg ZMP permissible area B1.

Figure 11:
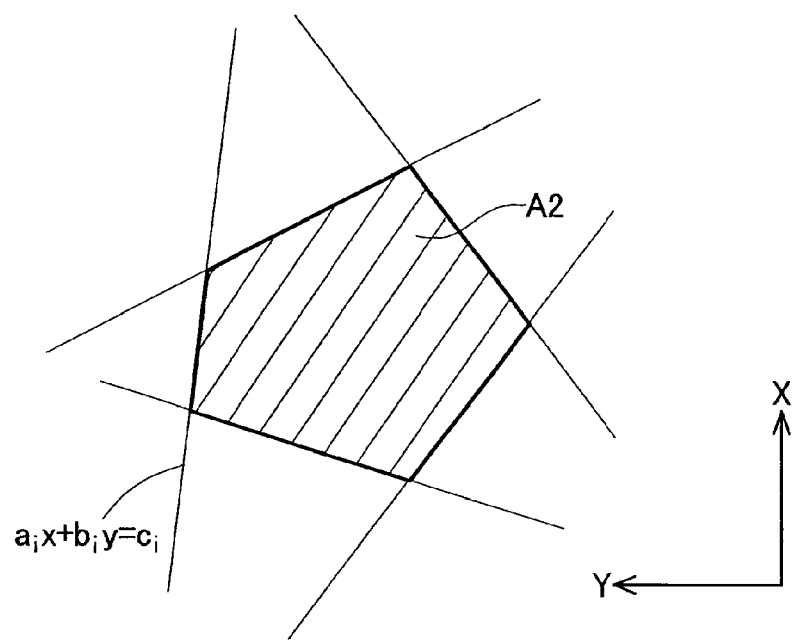
FIG. 11 is a diagram showing one example of a relationship between an area in which an idling leg can be grounded and the ZMP permissible area.

(Second step) Next, the second leg ZMP permissible area B2 is set from the area where the current idling leg (second leg) can ground, in other words, the possible grounding area A2, and the equations of the straight lines of each edge are determined (FIG. 11).

(Third step) Next, user parameters are set. Here, the user parameters are: the height h of the center of gravity, the initial ZMP movement time $t_0$, the reference single-leg time $T_{sd}$, the reference two-leg time $T_{bd}$, and the target velocity of the center of gravity at the end point of the period currently under consideration, $v_{xd}$, $v_{yd}$.

(Fourth step) Next, the ZMP position $p_{x2}$, $p_{y2}$ of the second leg is set to the center of the possible grounding area A2, or to a previously specified position, and (Expression 26) is solved. The ZMP position $p_{x2}$, $p_{y2}$ of the second leg given here corresponds to a temporary restraint condition (initial restraint condition).

$$\begin{bmatrix} r_{x1} & r_{x2} & 0 & 0 \\ 0 & 0 & r_{y1} & r_{y2} \\ 0 & 1 & 0 & 0 \\ 0 & 0 & 0 & 1 \end{bmatrix} \begin{bmatrix} p_{x1} \\ p_{x2} \\ p_{y1} \\ p_{y2} \end{bmatrix} = \begin{bmatrix} S_x \\ S_y \\ \rho_1 \\ \rho_2 \end{bmatrix}$$ [Expression 26]

(Expression 26) corresponds to (Expression 6) in the previous example. By solving (Expression 26), the values of $p_{x1}$, $p_{x2}$, $p_{y1}$, $p_{y2}$ are determined.

(Fifth step) Next, it is investigated whether or not the ZMP positions $p_{x1}$, $p_{x2}$, $p_{y1}$, $p_{y2}$ are out of the ZMP permissible area. If a ZMP position is not located out of the ZMP permissible area, then the controller transfers to the tenth step which is described below. If the ZMP position is located out of the ZMP permissible area, then a straight line close to this ZMP position which is out of the ZMP permissible area is added as a new restraint condition. The example in which the first leg ZMP position $p_{x1}$, $p_{x2}$ is located out of the first leg ZMP permissible area B1 has been described with reference to FIG. 5 and FIG. 6 above. In the case of FIG. 5, the straight line $a_1x+b_1y=c_1$ corresponds to the added restraint condition. In the case of FIG. 6, the straight line $a_1x+b_1y=c_1$ and the straight line $a_2x+b_2y=c_2$ correspond to the added restraint conditions.

(Sixth step) Next, the number of restraint conditions to be added is investigated. If one restraint condition is added (the case of FIG. 5), then the straight line $a_1x+b_1y=c_1$ is added to (Expression 26) as the restraint condition, and (Expression 27) below is solved. The restraint condition is added to the third line in (Expression 27).

$$\begin{bmatrix} r_{x1} & r_{x2} & 0 & 0 \\ 0 & 0 & r_{y1} & r_{y2} \\ a_1 & 0 & b_1 & 0 \\ 0 & 0 & 0 & 1 \end{bmatrix} \begin{bmatrix} p_{x1} \\ p_{x2} \\ p_{y1} \\ p_{y2} \end{bmatrix} = \begin{bmatrix} S_x \\ S_y \\ c_1 \\ \rho_2 \end{bmatrix}$$ [Expression 27]

If two restraint conditions are added (the case of FIG. 6), then the straight line $a_1x+b_1y=c_1$ and the straight line $a_2x+b_2y=c_2$ are added to (Expression 26) as restraint conditions, and (Expression 28) below is solved. The restraint condition is added to the third line and the fourth line in (Expression 28). If there are three restraint conditions, the controller 14 transfers to the eighth step described below. Furthermore, if there are four or more restraint conditions, then (Expression 26) can be solved. In this case, walking cannot be continued, and therefore the walking movement of the walking robot is halted.

$$\begin{bmatrix} r_{x1} & r_{x2} & 0 & 0 \\ 0 & 0 & r_{y1} & r_{y2} \\ a_1 & 0 & b_1 & 0 \\ 0 & a_2 & 0 & b_2 \end{bmatrix} \begin{bmatrix} p_{x1} \\ p_{x2} \\ p_{y1} \\ p_{y2} \end{bmatrix} = \begin{bmatrix} S_x \\ S_y \\ c_1 \\ c_2 \end{bmatrix}$$ [Expression 28]

(Seventh step) Next, the rank of the matrix A is investigated. Here, the matrix A corresponds to the matrix on the left side in (Expression 26), (Expression 27) or (Expression 28). If the matrix A is full rank, then (Expression 26), (Expression 27) or (Expression 28) can be solved in the form of (Expression 10). In this case, after solving (Expression 26), (Expression 27) or (Expression 28), the controller 14 returns to the fifth step. If matrix A does not have the full rank, then the controller 14 transfers to the next step, the eighth step.

(Eighth step) Next, (Expression 26), (Expression 27) or (Expression 28) are solved by (freely) adding the first leg grounding timing $t_1$ as a variable. The values of $t_1$, $p_{x1}$, $p_{y1}$, $p_{x2}$ and $p_{y2}$ are determined from the added restraint condition and (Expression 5). If no solution is determined, then the walking movement is halted.

(Ninth step) Next, it is checked whether or not the grounding timing $t_1$ is too early. The reason for this is that if the grounding timing $t_1$ is too early, then the swinging velocity of the idling leg is too great. If the grounding timing $t_1$ is within an appropriate range, then the controller 14 returns to the fifth step. If the grounding timing $t_1$ is out of an appropriate range, then the walking movement is halted. The appropriate range of the grounding timing $t_1$ is given in advance.

(Tenth step) Finally, the trajectory of the center of gravity and the trajectory of the foot of the idling leg (first leg trajectory) are generated from the determined values of $t_1$, $p_{x1}$, $p_{y1}$, $p_{x2}$ and $p_{y2}$, and the initial conditions. The trajectory of the center of gravity is given by (Expression 3).

Practical examples of the present invention were described in detail above, but these are no more than illustrative examples, which do not restrict the scope of the claims. The technology described in the claims includes various changes and modifications to the concrete examples given above. The technical elements described in the specification or illustrated in the drawings display technical utility either independently or in combination, and are not limited to the combinations stated in the claims at the time of application. Furthermore, the technologies described in the specification or illustrated in the drawings can achieve a plurality of objects simultaneously, and have technical utility in achieving any one of this plurality of objects.

What is claimed is:

1. A method for controlling a biped robot,
    the biped robot being configured to walk by repeating a first single-leg grounded period, a two-leg grounded period and a second single-leg grounded period, wherein the biped robot stands only with a first leg in the first single-leg grounded period and stands only with a second leg in the second single-leg grounded period,
    the method comprising:
    setting boundary conditions at a start point and an end point of a trajectory of a center of gravity which includes a first single-leg grounded period and a second single-leg grounded period;
    calculating a second leg ZMP position during the first single-leg grounded period, the second leg ZMP position representing a ZMP position in the second single-leg grounded period, the calculating including steps of,
        obtaining the second leg ZMP position by giving the boundary conditions and a predetermined grounding timing of the second leg into a ZMP equation, and
        computing a modified min of the second leg if the second le ZMP position obtained based on the predetermined grounding timing is out of a second leg ZMP permissible area which is defined corresponding to a possible grounding area of the second leg, wherein the modified grounding timing is computed so that the second leg ZMP position obtained based on the modified grounding timing is located in the second leg ZMP permissible area;

determining a grounding position of the second leg so that the second leg ZMP position is located in a contact area between the second leg and a ground; and moving joints of the second leg so as to achieve the determined grounding position and the predetermined or modified grounding timing.

2. The method of claim 1, wherein:

the ZMP equation includes, as parameters, the second leg ZMP position and a first leg ZMP position which represents a ZMP position in the first single-leg grounded period, the obtaining the second leg ZMP position includes a substep of determining the first leg ZMP position and the second leg ZMP position which satisfy the ZMP equation under the boundary conditions and a predetermined initial restraint condition, and the modified grounding timing is computed so as to satisfy the ZMP equation under a second leg ZMP restraint condition which restricts the second leg ZMP position within the second leg ZMP permissible area.

3. The method of claim 2, wherein the second leg ZMP restraint condition restricts the second leg ZMP position to a boundary of the second leg ZMP permissible area.

4. The method of claim 2, wherein a first leg ZMP restraint condition restricts the first leg ZMP position to the first leg ZMP permissible area, the substep includes re-obtaining the first leg ZMP position and the second leg ZMP position which satisfy the ZMP equation under the first leg ZMP restraint condition if the obtained first leg ZMP position is located out of a first leg ZMP permissible area defined within a ground contact area of the first leg, and the modified grounding timing is computed so as to satisfy the ZMP equation under the first leg ZMP restraint condition and the second leg ZMP restraint condition.

5. A biped robot comprising:

a controller implementing the method of claim 1; and a sensor for detecting an obstacle, wherein the controller determines the possible grounding area based on a result of detecting the obstacle.

6. The method of claim 1, wherein the boundary conditions includes at least one of the position of the center of the gravity of the biped robot at the start point, the velocity of the center of the gravity of the biped robot at the start point, the position of the center of the gravity of the biped robot at the end point, or the velocity of the center of the gravity of the biped robot at the end point.

7. The method of claim 1, wherein the second leg ZMP permissible area is determined by at least the mechanical structure of the legs.

8. The method of claim 7, wherein the second leg ZMP permissible area is determined by at least a position of an obstacle around the biped robot.

9. The method of claim 1, wherein the predetermined grounding timing is determined so that the biped robot steps in a uniform time cycle.

10. The method of claim 1, wherein the determining of the grounding position of the second leg is performed during the first single-leg grounded period.

* * * * *

UNITED STATES PATENT AND TRADEMARK OFFICE
CERTIFICATE OF CORRECTION

| | | |
|---|---|---|
| PATENT NO. | : 8,565,921 B2 | Page 1 of 1 |
| APPLICATION NO. | : 13/549250 | |
| DATED | : October 22, 2013 | |
| INVENTOR(S) | : Masahiro Doi | |

It is certified that error appears in the above-identified patent and that said Letters Patent is hereby corrected as shown below:

In the Claims:

At column 18, line 62, please change "a modified min of the" to -- a modified grounding timing of the --.

At column 18, line 63, please change "le ZMP" to -- leg ZMP --.

At column 20, line 13, please change "one of the position" to -- one of a position --.

At column 20, line 13, please change "of the gravity" to -- of gravity --.

At column 20, line 14, please change "the velocity" to -- a velocity --.

At column 20, line 15, please change "the biped" to -- biped --.

At column 20, line 15, please change "the position" to -- a position --.

At column 20, line 16, please change "of the gravity" to -- of gravity --.

At column 20, line 17, please change "or the velocity" to -- or a velocity --.

At column 20, line 20, please change "the mechanical" to -- a mechanical --.

Signed and Sealed this
Eleventh Day of March, 2014

Michelle K. Lee
*Deputy Director of the United States Patent and Trademark Office*